US009754442B2

(12) United States Patent
Dupuis et al.

(10) Patent No.: US 9,754,442 B2

(45) Date of Patent: Sep. 5, 2017

(54) 3D ENHANCED GAMING MACHINE WITH FOREGROUND AND BACKGROUND GAME SURFACES

(71) Applicant: IGT CANADA SOLUTIONS ULC, Moncton (CA)

(72) Inventors: Reuben Dupuis, Moncton (CA); Vicky Leblanc, Moncton (CA); Edward Bowron, Shediac Bridge (CA)

(73) Assignee: IGT CANADA SOLUTIONS ULC, Moncton (CA)

( * ) Notice: Subject to any disclaimer, the term of this patent is extended or adjusted under 35 U.S.C. 154(b) by 60 days.

(21) Appl. No.: 14/566,141

(22) Filed: Dec. 10, 2014

(65) Prior Publication Data

US 2015/0248809 A1 Sep. 3, 2015

Related U.S. Application Data

(63) Continuation-in-part of application No. 14/029,364, filed on Sep. 17, 2013, now Pat. No. 9,454,879, which (Continued)

(51) Int. Cl.

*A63F 13/00* (2014.01)
*G07F 17/32* (2006.01)
*G07F 17/34* (2006.01)

(52) U.S. Cl.

CPC ...... *G07F 17/3213* (2013.01); *G07F 17/3211* (2013.01); *G07F 17/34* (2013.01)

(58) Field of Classification Search

CPC ... G07F 17/32; G07F 17/3258; G07F 17/3262

(Continued)

(56) References Cited

U.S. PATENT DOCUMENTS 6,607,441 B1 8/2003 Acres
6,846,238 B2 1/2005 Wells (Continued)

FOREIGN PATENT DOCUMENTS

CA 2601560 A1 10/2006
CA 2783122 A1 1/2013

(Continued)

OTHER PUBLICATIONS

United States Patent and Trademark Office, Office Action dated Aug. 25, 2014, issued on U.S. Appl. No. 13/631,129.

(Continued)

*Primary Examiner* — Omkar Deodhar
*Assistant Examiner* — Ross Williams
(74) *Attorney, Agent, or Firm* — Sage Patent Group

(57) ABSTRACT

Disclosed is an electronic gaming machine that includes an electronic data store storing game data for a given game; an electronic 3D-enabled gaming display; and one or more processors. The processors are configured to: generate, with at least a three-dimensional graphics processor, game surfaces using the game data, each of the game surfaces for displaying at least one game symbol thereon; present a three-dimensional view of the game surfaces on the electronic display, the game surfaces arranged in layers such that a foreground game surface appears to be closer to the user than a background game surface; and in response to a game trigger event: remove at least one game symbol displayed on the foreground game surface from the game; and integrate at least one game symbol displayed on the background game surface into the game such that the integrated game symbol interacts with remaining game symbols displayed on the foreground game surface.

24 Claims, 12 Drawing Sheets

Related U.S. Application Data is a continuation-in-part of application No. 13/622,267, filed on Sep. 18, 2012, now Pat. No. 8,715,060, and a continuation-in-part of application No. 13/631,129, filed on Sep. 28, 2012.

(60) Provisional application No. 61/746,707, filed on Dec. 28, 2012.

(58) Field of Classification Search
USPC .......................................... 463/16–25, 30–33
See application file for complete search history.

(56) References Cited

U.S. PATENT DOCUMENTS

| | | | |
|---|---|---|---|
| 7,014,559 | B1 | 3/2006 | Fong |
| 7,804,995 | B2 | 9/2010 | Lipton et al. |
| 8,357,041 | B1 * | 1/2013 | Saunders ................ G07F 17/32 463/16 |
| 8,366,538 | B1 | 2/2013 | Saunders et al. |
| 8,371,930 | B1 | 2/2013 | Saunders et al. |
| 8,414,380 | B2 | 4/2013 | Saunders et al. |
| 8,715,060 | B2 | 5/2014 | Bowron |
| 2002/0122585 | A1 | 9/2002 | Swift et al. |
| 2003/0032479 | A1 | 2/2003 | LeMay et al. |
| 2003/0064805 | A1 | 4/2003 | Wells |
| 2003/0190948 | A1 | 10/2003 | Baerlocher et al. |
| 2004/0218269 | A1 | 11/2004 | Divelbiss et al. |
| 2005/0020278 | A1 | 1/2005 | Krumm et al. |
| 2005/0117637 | A1 | 6/2005 | Routhier et al. |
| 2005/0190180 | A1 | 9/2005 | Jin et al. |
| 2006/0287060 | A1 | 12/2006 | Yoshimi |
| 2007/0296859 | A1 | 12/2007 | Suzuki |
| 2008/0020845 | A1 | 1/2008 | Low et al. |
| 2008/0090636 | A1 | 4/2008 | Lathrop |
| 2008/0318684 | A1 | 12/2008 | Rofougaran |
| 2010/0248809 | A1 * | 9/2010 | Fitzsimons ......... G07F 17/3211 463/20 |
| 2010/0267439 | A1 | 10/2010 | Englman et al. |
| 2010/0298040 | A1 | 11/2010 | Joshi et al. |
| 2011/0032329 | A1 | 2/2011 | Bauza et al. |
| 2011/0045891 | A1 | 2/2011 | Ansari |
| 2011/0298795 | A1 | 12/2011 | Van Der Heijden et al. |
| 2012/0077564 | A1 | 3/2012 | Collette et al. |
| 2012/0077566 | A1 | 3/2012 | Schultz et al. |
| 2012/0122547 | A1 | 5/2012 | Aoki et al. |
| 2012/0165101 | A1 | 6/2012 | Krishnamoorthy et al. |
| 2013/0019024 | A1 | 1/2013 | Sheth et al. |
| 2013/0093752 | A1 | 4/2013 | Yuan |
| 2013/0178271 | A1 | 7/2013 | Aponte et al. |
| 2013/0184070 | A1 | 7/2013 | Gadher et al. |
| 2013/0184071 | A1 | 7/2013 | Gadher et al. |
| 2013/0310140 | A1 * | 11/2013 | Melnick .............. G07F 17/3213 463/20 |
| 2014/0094249 | A1 | 4/2014 | Gugler et al. |
| 2014/0094268 | A1 | 4/2014 | Adams |
| 2014/0194183 | A1 | 7/2014 | Pierer et al. |

FOREIGN PATENT DOCUMENTS

| | | | |
|---|---|---|---|
| CA | 2800295 | A1 | 3/2014 |
| CA | 2827465 | A1 | 3/2014 |
| EP | 2551832 | A2 | 1/2013 |
| WO | 2008118800 | A1 | 10/2008 |

OTHER PUBLICATIONS

Patent Cooperation Treaty, Written Opinion and International Search Report dated Oct. 30, 2013, issued on PCT Application No. PCT/CA2013/000636.

United States Patent and Trademark Office, Office Action dated Jun. 20, 2014, issued in U.S. Appl. No. 13/631,129.

Canadian Intellectual Property Office, Examination Report dated Dec. 15, 2014, issued in Canadian Patent Application No. 2,800,295.

United States Patent and Trademark Office, Office Action dated Apr. 3, 2015, issued on U.S. Appl. No. 13/631,129.

* cited by examiner

3D ENHANCED GAMING MACHINE WITH FOREGROUND AND BACKGROUND GAME SURFACES

CROSS-REFERENCE TO RELATED APPLICATIONS

This application is a continuation-in-part of U.S. patent application Ser. No. 14/029,364, filed Sep. 17, 2013. U.S. patent application Ser. No. 14/029,364 is a continuation-in-part of U.S. patent application Ser. No. 13/622,267, filed Sep. 18, 2012, and is a continuation-in-part of U.S. patent application Ser. No. 13/631,129, filed Sep. 28, 2012, and also claims the benefit of U.S. Provisional Patent Application No. 61/746,707, filed Dec. 28, 2012.

FIELD

Embodiments described herein relate to electronic gaming machines. The embodiments described herein particularly relate to an enhanced electronic gaming machine with foreground and background game surfaces.

INTRODUCTION

Various video gaming terminals or machines may consist of slot machines, online gaming systems (that enable users to play games using computer devices, whether desktop computers, laptops, tablet computers or smart phones), computer programs for use on a computer device (including desktop computer, laptops, tablet computers of smart phones), or gaming consoles that are connectable to a display such as a television or computer screen.

Video gaming machines may be configured to enable users to play a variety of different types of games. Example games may involve a matrix or grid of cells, where gaming symbols or elements may be displayed within the cells. One type of game displays a plurality of moving arrangements of gaming elements (such as reels, and symbols on reels) within a matrix. Another type of game displays gaming elements within a matrix in a fixed arrangement such as a Keno or Bingo type game. Players may wager on gaming outcomes. One or more winning combinations may be displayed using a pattern of gaming elements in an arrangement of cells (or an "array") of the matrix, where each cell may include a gaming element, and where gaming elements may define winning combinations (or a "winning pattern"). Games that are based on winning patterns may be referred to as "pattern games".

One example of a pattern game is a game that includes spinning reels, where a user wagers on one or more lines, activates the game, and the spinning reels are stopped to show one or more patterns in an array. The game rules may define one or more winning patterns of gaming elements, and these winning patterns may be associated with credits, points or the equivalent.

Another example type of game may be a Keno or Bingo type game where different gaming elements are activated that correspond to one or more gaming elements in the cells of the matrix, and the activated gaming elements may be used to define one or more winning combinations.

Gaming systems or machines of this type are popular. However, there is a need to compete for the attention of users, and therefore it is necessary to innovate by launching games with new and engaging game features.

SUMMARY

In accordance with an aspect, there is provided an electronic gaming machine. The electronic gaming machine includes an electronic data store storing game data for a given game; an electronic 3D-enabled gaming display; and one or more processors in communication with the at least one electronic data store and the electronic 3D-enabled gaming display, the one or more processors comprising a three-dimensional graphics processor. The one or more processors are configured to: generate, with at least the three-dimensional graphics processor, a plurality of game surfaces using the game data, each of the game surfaces for displaying at least one game symbol thereon; present a three-dimensional view of the game surfaces on the electronic 3D-enabled gaming display, the game surfaces arranged in layers such that a foreground game surface of the plurality of game surfaces appears to be closer to the user than a background game surface of the plurality of game surfaces, the foreground game surface having a plurality of game symbols displayed thereon; and in response to a game trigger event: remove at least one game symbol displayed on the foreground game surface from the given game in association with a graphical animation effect displayed on the electronic 3D-enabled gaming display representative of the removing, the graphical animation effect comprising a visual designation of the at least one game symbol; and integrate at least one game symbol displayed on the background game surface into the given game in association with a graphical animation effect displayed on the electronic 3-D gaming display representative of the integrating, such that the integrated at least one game symbol interacts with remaining game symbols displayed on the foreground game surface.

In accordance with another aspect, there is provided a method for providing an electronic game. The method includes: generating, at at least one processor, a plurality of game surfaces using the game data, each of the game surfaces for displaying at least one game symbol thereon; presenting a three-dimensional view of the game surfaces on an electronic 3D-enabled gaming display, the game surfaces arranged in layers such that a foreground game surface of the plurality of game surfaces appears to be closer to the user than a background game surface of the plurality of game surfaces, the foreground game surface having a plurality of game symbols displayed thereon; and in response to a game trigger event: removing, at the at least one processor, at least one game symbol displayed on the foreground game surface from the given game in association with a graphical animation effect displayed on the electronic 3D-enabled gaming display representative of the removing, the graphical animation effect comprising a visual designation of the at least one game symbol; and integrating, at the at least one processor, at least one game symbol displayed on the background game surface into the given game in association with a graphical animation effect displayed on the electronic 3-D gaming display representative of the integrating, such that the integrated at least one game symbol interacts with remaining game symbols displayed on the foreground game surface.

In accordance with a further aspect, there is provided a computer system for providing an electronic game. The system includes: a gaming server having an electronic data store storing game data for a given game; and a gaming device having an electronic 3D-enabled gaming display, the gaming device interconnected with the gaming server by way of a communication network. At least one of the gaming server and the gaming device configured to: generate a plurality of game surfaces using the game data stored at the gaming server, each of the game surfaces for displaying at least one game symbol thereon; present a three-dimensional view of the game surfaces on the electronic 3D-enabled gaming display of the gaming device, the game surfaces arranged in layers such that a foreground game surface of the plurality of game surfaces appears to be closer to the user than a background game surface of the plurality of game surfaces, the foreground game surface having a plurality of game symbols displayed thereon; and in response to a game trigger event: remove at least one game symbol displayed on the foreground game surface from the given game in association with a graphical animation effect displayed on the electronic 3D-enabled gaming display representative of the removing, the graphical animation effect comprising a visual designation of the at least one game symbol; and integrate at least one game symbol displayed on the background game surface into the given game in association with a graphical animation effect displayed on the electronic 3-D gaming display representative of the integrating, the integrating such that the integrated at least one game symbol interacts with remaining game symbols displayed on the foreground game surface.

In accordance with yet another aspect, there is provided an electronic gaming machine. The electronic gaming machine includes: an electronic data store storing game data for a given game; an electronic 3D-enabled touch-sensitive gaming display; and one or more processors in communication with the at least one electronic data store and the electronic 3D-enabled gaming display, the one or more processors comprising a three-dimensional graphics processor. The one or more processors are configured to: generate, with at least the three-dimensional graphics processor, a plurality of game surfaces using the game data, each of the game surfaces for displaying at least one game symbol thereon; present an interactive three-dimensional view of the game surfaces on the electronic 3D-enabled gaming display, the game surfaces arranged in layers such that a foreground game surface of the plurality of game surfaces appears to be closer to the user than a background game surface of the plurality of game surfaces, the foreground game surface having a plurality of game symbols displayed thereon; and in response to a touch input received by way of the touch-sensitive gaming display or a pre-defined game trigger event: remove at least one game symbol displayed on the foreground game surface from the given game in association with a graphical animation effect displayed on the electronic 3D-enabled gaming display representative of the removing, the graphical animation effect comprising a visual designation of the at least one game symbol; and integrate at least one game symbol displayed on the background game surface into the given game in association with a graphical animation effect displayed on the electronic 3-D gaming display representative of the integrating, such that the integrated at least one game symbol interacts with remaining game symbols displayed on the foreground game surface.

Many further features and combinations thereof concerning embodiments described herein will appear to those skilled in the art following a reading of the instant disclosure.

DETAILED DESCRIPTION

Embodiments described herein relate to an electronic gaming machine (EGM) that includes a three-dimensional (3D) graphics processor, and provides games with 3D enhanced game components, e.g., game symbols, game surfaces, and the like.

In particular, the EGM is configured to generate a plurality of game surfaces for a given game using stored game data, and to present a 3D view of the game surfaces. In this 3D view, the game surfaces are arranged in layers such that a foreground game surface appears to be closer to the user than a background game surface. Other game surfaces may also be layered behind the background game surface, with each such layer appearing to be progressively father from the user. Each of the surfaces may have at least one game symbol displayed thereon.

The EGM is configured to remove one or more game symbols from the foreground game surface in response to a game trigger event, and to integrate one or more game symbols from the background game surface such that the integrated game symbols interact with remaining game symbols displayed on the foreground game surface.

In this way, game symbols on the background game surface are introduced to the given game while game symbols on the foreground game surface are eliminated from the given game.

The given game may be any of a variety of game types, such as a reel-type game, a keno-type game, a bingo-type game, and so on, and the game symbols may relate to any of these game types.

The EGM may be embodied in a variety of forms and devices including, for example, portable devices, such as tablets and smart phones, that can access a gaming site or a portal (which may access a plurality of gaming sites) via the Internet or other communication path (e.g., a LAN or WAN). The EGM may be located in various venues, such as, e.g., a casino or an arcade. One example type of EGM is described with respect to FIG. 1.

Figure 1:
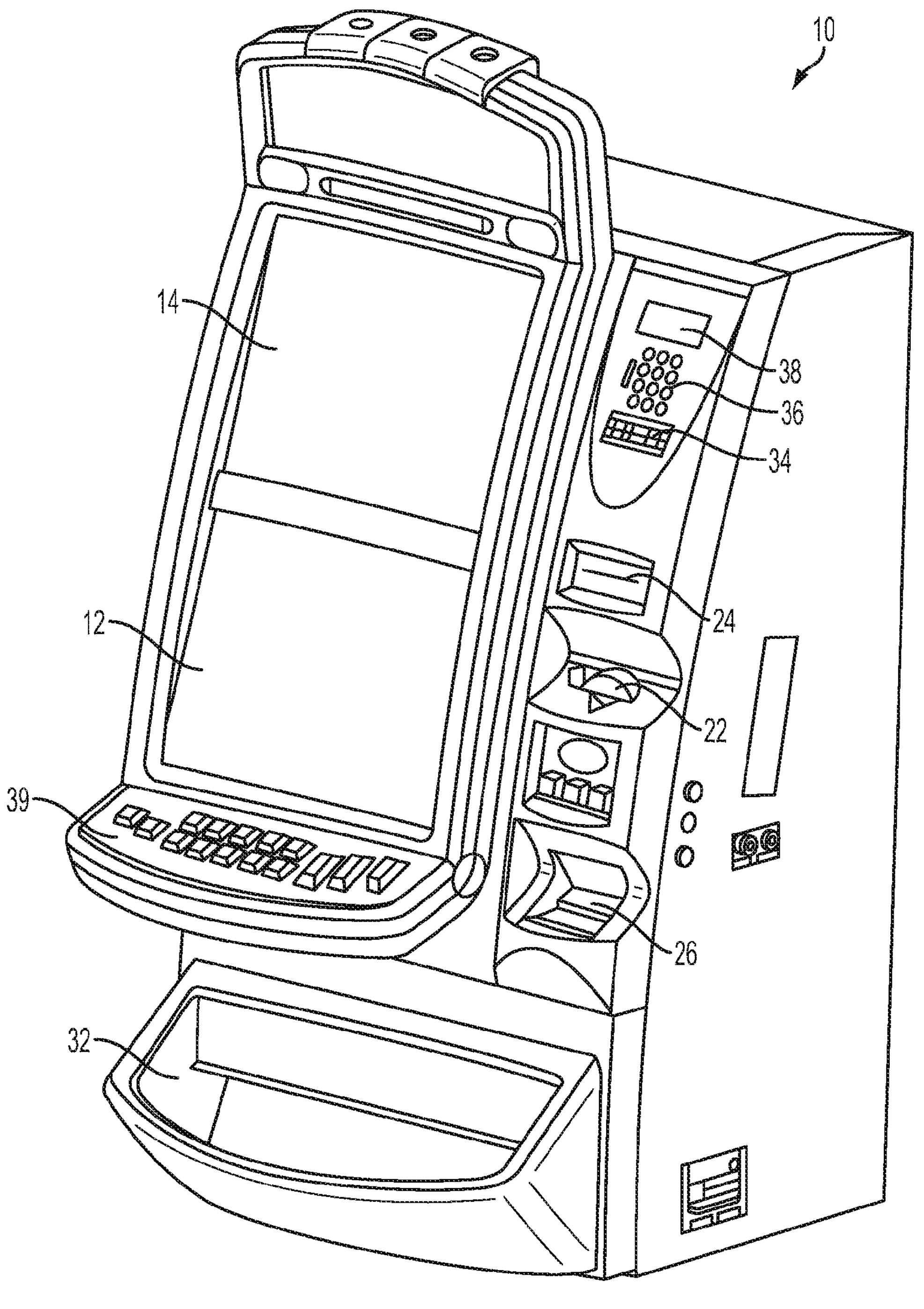
FIG. 1 is a perspective view of an electronic gaming machine for implementing gaming enhancements, in accordance with an embodiment.

FIG. 1 is a perspective view of an EGM 10 adapted to provide games with 3D enhanced game components, exemplary of an embodiment. EGM 10 includes a display 12 that may be a thin film transistor (TFT) display, a liquid crystal display (LCD), a cathode ray tube (CRT), auto stereoscopic three-dimensional display and LED display, an OLED display, or any other type of display. An optional second display 14 provides game data or other information in addition to display 12. Display 14 may provide static information, such as an advertisement for the game, the rules of the game, pay tables, pay lines, or other information, or may even display the main game or a bonus game along with display 12. Alternatively, the area for display 14 may be a display glass for conveying information about the game. Display 12 or 14 may also include a camera, sensor, and other hardware input devices.

Display 12 or 14 may have a touch screen lamination that includes a transparent grid of conductors. Touching the screen may change the capacitance between the conductors, and thereby the X-Y location of the touch may be determined. A processor of EGM 10 associates this X-Y location with a function to be performed. Such touch screens may be used for slot machines, for example. There may be an upper and lower multi-touch screen in accordance with some embodiments.

One or both of display 12 and 14 may be a 3D-enabled gaming display, configured to display 3D enhancements for a game played at EGM 10. So, in an embodiment, one or both of display 12 and 14 may be configured to display 2D images representative of 3D enhancements. In another embodiment, one or both of display 12 and 14 may be configured to have auto-stereoscopic three-dimensional functionality.

A coin slot 22 may accept coins or tokens in one or more denominations to generate credits within EGM 10 for playing games. An input slot 24 for an optical reader and printer receives machine readable printed tickets and outputs printed tickets for use in cashless gaming.

A coin tray 32 may receive coins or tokens from a hopper upon a win or upon the player cashing out. However, EGM 10 may be a gaming terminal that does not pay in cash but only issues a printed ticket for cashing in elsewhere. Alternatively, a stored value card may be loaded with credits based on a win, or may enable the assignment of credits to an account associated with a computer system, which may be a computer network connected computer.

A card reader slot 34 may accept various types of cards, such as smart cards, magnetic strip cards, or other types of cards conveying machine readable information. Card reader slot 34 is coupled to a card reader (e.g., card reader 49 of FIG. 2).

Alternatively, an electronic device may couple (by way of a wired or wireless connection) to EGM 10 to exchange electronic data signals to transfer player credits and the like. For example, near field communication (NFC) may be used to couple to EGM 10, which may be configured with NFC-enabled hardware. This is a non-limiting example of a communication technique.

A keypad 36 may accept player input, such as a personal identification number (PIN) or any other player information. A display 38 above keypad 36 displays a menu for instructions and other information and provides visual feedback of the keys pressed.

Keypad 36 may be a input device such as a touchscreen, or dynamic digital button panel, in accordance with some embodiments.

Player control buttons 39 may include any buttons or other controllers needed to play the particular game or games offered by EGM 10 including, for example, a bet button, a repeat bet button, a spin reels (or play) button, a maximum bet button, a cash-out button, a display pay lines button, a display payout tables button, select icon buttons, and any other suitable button. Buttons 39 may be replaced by a touch screen with virtual buttons.

EGM 10 may also include a digital button panel. The digital button panel may include various elements such as for example, a touch display, animated buttons, frame light, and so on. The digital button panel may have different states, such as for example, standard play containing bet steps, bonus with feature layouts, point of sale, and so on. The digital button panel may include a slider bar for adjusting the three-dimensional panel. The digital button panel may include buttons for adjusting sounds and effects. The digital button panel may include buttons for betting and selecting bonus games. The digital button panel may include a game status display. The digital button panel may include animation. The buttons of the digital button panel may include a number of different states, such as pressable but not activated, pressed and active, inactive (not pressable), certain response or information animation, and so on.

EGM 10 may also include hardware configured to provide motion or gesture tracking. An example type of motion tracking is optical motion tracking. The motion tracking may include a body and head controller. The motion tracking may also include an eye controller. EGM 10 may implement eye-tracking recognition technology using a camera, sensors (e.g. optical sensor), data receivers, and other electronic hardware. The camera may be used for gesture or motion tracking of player, such as detecting player positions and movements, and generating signals defining x, y and z coordinates. A gesture or motion by a player may trigger a game trigger event that causes a game symbol to be removed from a game surface, as detailed below.

EGM 10 may also include a plurality of effects lights and frame lights. The lights may be synchronized with enhancements of the game. EGM 10 may be configured to control color and brightness of lights. Additional custom animations (color cycle, blinking, etc.) may also be configured by EGM 10. The custom animations may be triggered by certain game trigger events.

EGM 10 may also include an output device such as one or more speakers. The speakers may be located in various locations on EGM 10 such as in a lower portion or upper portion. EGM 10 may have a chair or seat portion and the speakers may be included in the seat portion to create a surround sound effect for the player. The seat portion may allow for easy upper body and head movement during play. Functions may be controllable via an on-screen game menu.

EGM 10 may be configurable to provide automated control over some or all of the functionality detailed above (effects lights, frame lights, sounds, and so on).

Figure 2A:
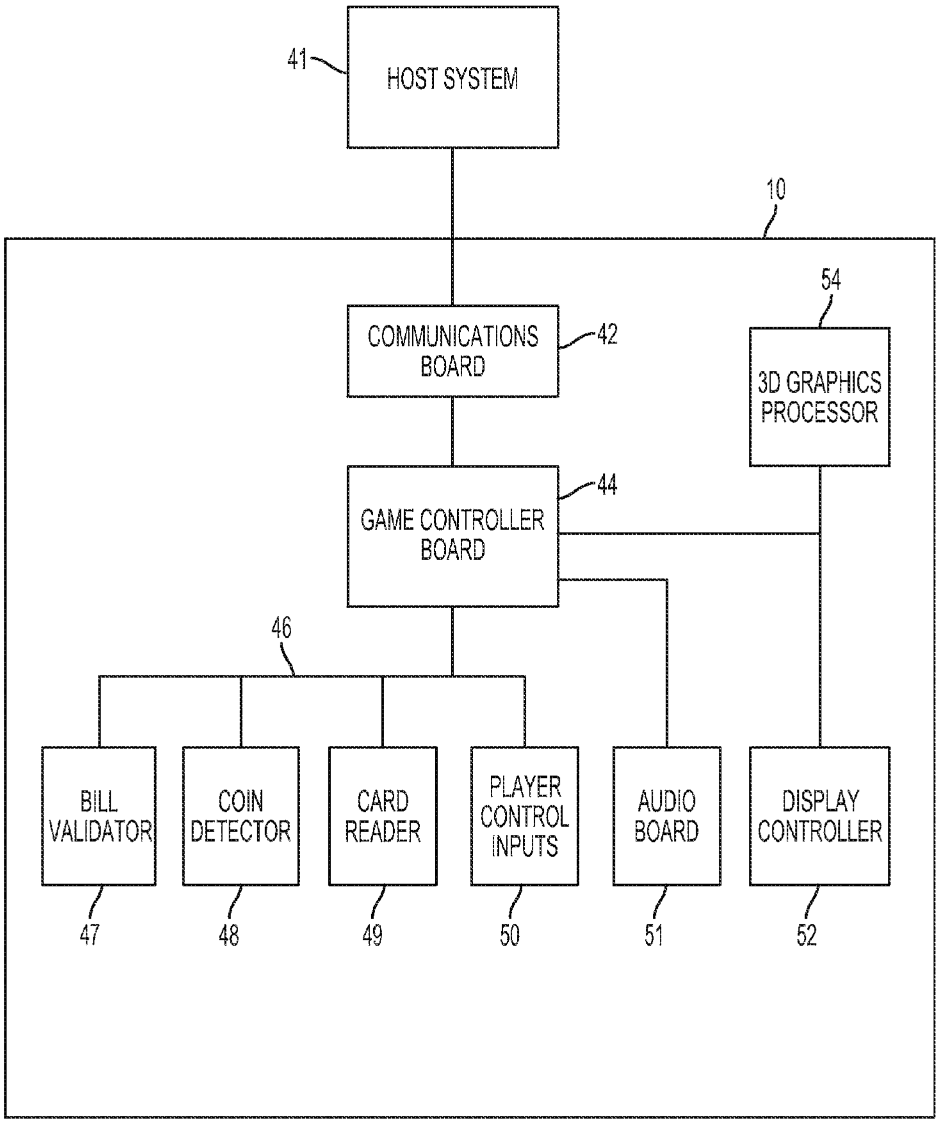
FIG. 2A is a schematic diagram of the electronic gaming machine of FIG. 1, in accordance with an embodiment.

FIG. 2A is a block diagram depicting further hardware components of EGM 10, in accordance with an embodiment. These hardware components are particularly configured to provide games with 3D enhanced game components, as detailed below.

A communications board 42 may contain conventional circuitry for coupling EGM 10 to a network. So, communication board 42 may include a network interface allowing EGM 10 to communicate with other components, to access and connect to network resources, to serve an application, to access other applications, and to perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

EGM 10 may communicate over a network using any suitable protocol, such as the G2S protocols. Internet protocols are typically used for such communication under the G2S standard, incorporated herein by reference.

Communications board 42 may communicate with a network using a wireless transceiver, or it may be wired to a network. Communications board 42 may set up a communication link with a master controller and may buffer data between the network and game controller board 44. Communications board 42 may also communicate with a network server, such as in accordance with the G2S standard, for exchanging information according to embodiments described herein.

Game controller board 44 includes memory and a processor for carrying out program instructions stored in the memory and for providing the information requested by the network. Game controller board 44 executes game routines, and cooperates with 3D graphics processor 54 to provide games with 3D enhanced game components.

Peripheral devices/boards communicate with game controller board 44 via a bus 46 using, for example, an RS-232 interface. Such peripherals may include a bill validator 47, a coin detector 48, a smart card reader or other type of credit card reader 49, and player control inputs 50. Inputs 50 may include or interface with any of the buttons or touch screens described above with reference to FIG. 1. Other peripherals may be one or more cameras used for collecting player input data, or other player movement or gesture data that may be used to trigger the three-dimensional supplemental game.

Card reader 49 reads cards for player and credit information for cashless gaming. Card reader 49 may read a magnetic code on a conventional player tracking card, where the code uniquely identifies the player to a host system at the venue. The code is cross-referenced by host system 41 to any data related to the player, and such data may affect the games offered to the player by the gaming terminal. Card reader 49 may also include an optical reader and printer for reading and printing coded barcodes and other information on a paper ticket. A card may also include credentials that enable host system 41 to access one or more accounts associated with a user. The account may be debited based on wagers by a user and credited based on a win.

Game controller board 44 may also control one or more devices that produce the game output including audio and video output associated with a particular game that is presented to the user. For example audio board 51 may convert coded signals into analog signals for driving speakers.

Game controller board 44 may be coupled to an electronic data store storing game data for one or more games. The game data may, for example, include a set of game rules for each of the one or more games. The electronic data store may reside in a data storage device, e.g., a hard disk drive, a solid state drive, or the like. Such a data storage device may be included in EGM 10, or may reside at host system 41. In some embodiments, the electronic data store storing game data may reside in the cloud.

A 3D graphics processor 54 may be configured to generate and render 3D game enhancements, e.g., 3D views of game surfaces for displaying game symbols. 3D graphics processor 54 may cooperate with game controller board 44 to generate and render 3D game enhancements based on one or more game rules. 3D graphics processor 54 may be a specialized electronic circuit adapted for 3D image processing in order to manipulate and transform data stored in memory and accelerate the creation of 3D images in a frame buffer for output to a display by way of display controller 52. 3D graphics processor 54 may redraw various 3D game enhancements as they dynamically update.

A display controller 52 may convert coded signals to pixel signals for one or more interconnected displays, e.g., display 12 or display 14.

Host system 41 may store account data for players. EGM 10 may communicate with host system 41 to update such account data, for example, based on wins and losses. In an embodiment, host system 41 stores the aforementioned game data, and EGM 10 may retrieve such game data from host system 41 during operation.

Figure 2B:
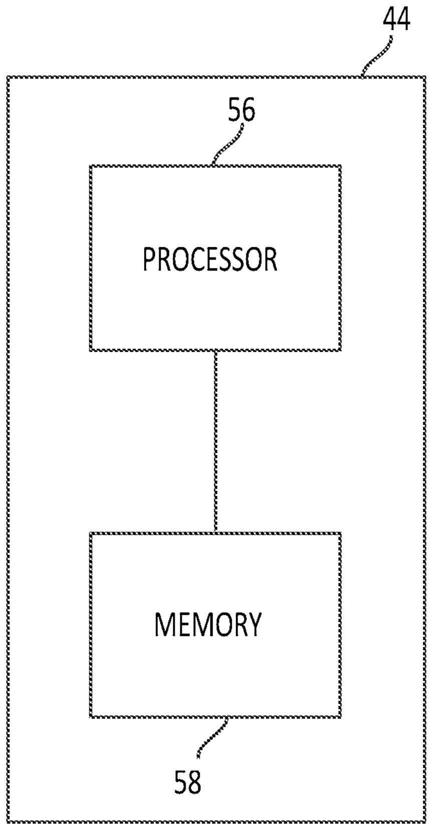
FIG. 2B is a high-level block diagram of a game controller board of the electronic gaming machine of FIG. 2A, in accordance with an embodiment.

FIG. 2B is a block diagram depicting components of game controller board 44. As depicted, game controller board 44 includes one or more processors 56 and memory 58.

Processor 56 may be any type of processor, such as, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof. Memory 58 may be any type of electronic memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

In some embodiments, the electronics on the various boards described herein may be combined onto a single board. Similarly, in some embodiments, the electronics on the various controllers and processors described herein may be integrated. For example, the processor of game controller board 44 and 3D graphics processor 54 may be a single integrated chip.

Figure 3A:
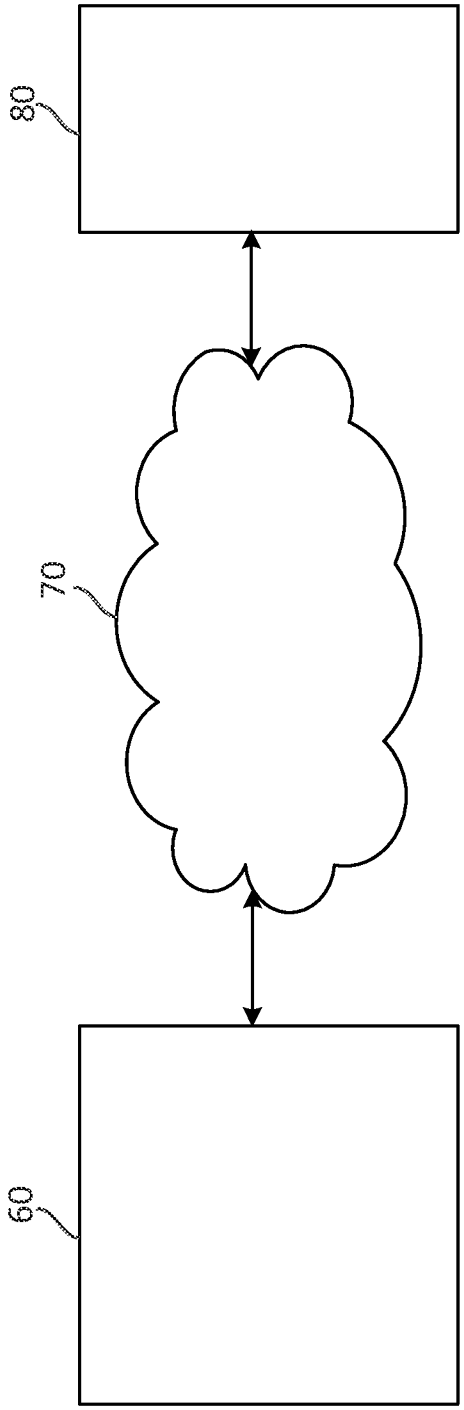
FIG. 3A is a schematic diagram of an exemplary online implementation of a computer system and online gaming system, in accordance with an embodiment.

FIG. 3A illustrates an online implementation of a gaming system that provides 3D enhancements as disclosed herein, exemplary of some embodiments. As depicted, the gaming system includes a gaming server 80 and a gaming device 60, interconnected by a communication network 70.

In some embodiments, gaming server 80 and gaming device 60 cooperate to implement the functionality of EGM 10, described above. So, aspects and technical features of EGM 10 may be implemented in part at gaming device 60, and in part at gaming server 80.

Gaming server 80 may be configured to enable online gaming, and may store game data and game logic to implement the games and enhancements disclosed herein. For example, gaming server 80 may include a player input engine configured to process player input and respond according to game rules. Gaming server 80 may include a graphics engine configured to generate 3D enhancements as disclosed herein. Gaming server 80 may also include a movement recognition engine that may be used to process and interpret collected player movement data, to transform the data into data defining manipulations of game components or view changes.

In some embodiments, gaming server 80 may transmit game data (including game rules) to gaming device 60 so that 3D enhancements (e.g., 3D views of game surfaces) may be generated at gaming device 60. In some embodiments, gaming server 80 may transmit rendering instructions and graphics data to gaming device 60 so that graphics may be rendered at gaming device 60. Data may be exchanged between gaming server 80 and gaming device 60 by way of communication network 70.

Network 70 may be any type of network, such as, e.g., Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

Gaming device 60 may reside on any networked computing device, such as a personal computer, workstation, server, portable computer, mobile device, personal digital assistant, laptop, tablet, smart phone, an interactive television, video display terminals, gaming consoles, electronic reading device, and portable electronic devices or a combination of these.

Gaming device 60 connects to gaming server 80, by way of network 70, in order to access the functionality and data described herein. In some embodiments, gaming device 60 may connect to EGM 10, by way of network 70, in order to access the functionality and data described herein.

For clarity of illustration, only one gaming device 60 is shown in FIG. 3A. However, the gaming system may include one or more gaming devices 60, each operated by respective players.

Figure 3B:
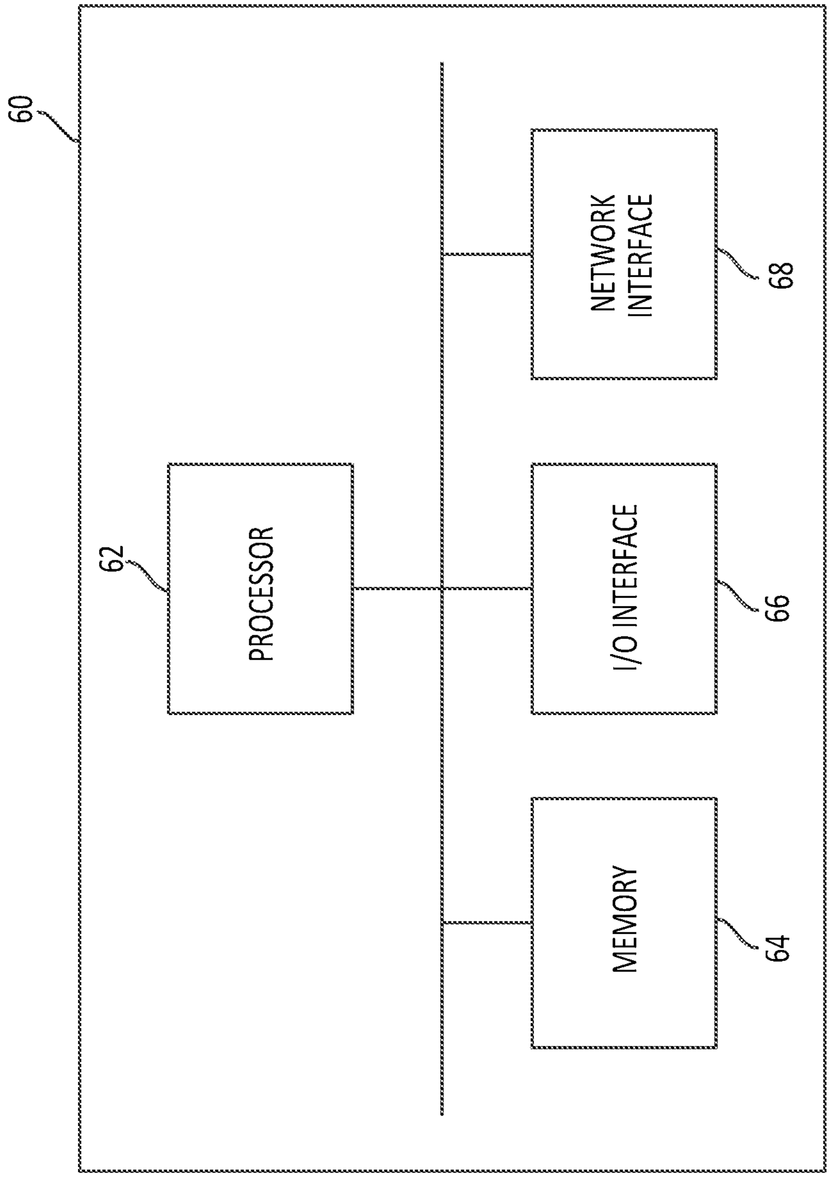
FIG. 3B is a high-level block diagram of the computer system of FIG. 3A, in accordance with an embodiment.

FIG. 3B is a block diagram depicting hardware components of a gaming device 60, exemplary of an embodiment.

As depicted, gaming device 60 includes at least one processor 62, memory 64, at least one I/O interface 66, and at least one network interface 68.

Processor 62 may be any type of processor, such as, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof.

Processor 62 may also be a 3D graphics processor adapted to generate and render 3D graphics, as described above.

Memory 64 may be any type of electronic memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

I/O interfaces 66 enables gaming device 60 to interconnect with input and output devices, e.g., peripheral devices or external storage devices. Such peripheral devices may include one or more input devices, such as a keyboard, mouse, camera, touch screen and a microphone, and may also include one or more output devices such as a display screen (with three-dimensional capabilities) and a speaker.

Network interfaces 68 enables gaming device 60 to communicate with other networks, to access and connect to network resources, to serve an application, to access other applications, and perform other computing applications by connecting to a network such as network 70.

In an embodiment, gaming server 80 may include hardware components substantially similar to those shown in FIG. 3B.

In an embodiment, gaming device 60 and/or gaming server 80 may be implemented using multiple devices, multiple databases, or multiple storage devices distributed over a wide geographic area and connected via a network (which may be referred to as "cloud computing").

In an embodiment, EGM 10 and gaming server 80 may be integrated as a single system or a single device.

EGM 10 may be configured to provide 3D enhancements to one or more games playable at EGM 10. The enhancements may be enhancements to a primary game, or may be enhancements to a secondary or bonus game.

In an embodiment, the 3D enhancements relate to generating and presenting a 3D view of a plurality of game surfaces for displaying game symbols in accordance with a given game. This 3D view may be updated as the game surfaces are modified in manners disclosed herein. For example, the 3D view may be updated when game symbols are removed from, or added to, game surfaces. Similarly, the 3D view may also be updated when game surfaces are removed or added.

Figure 4:
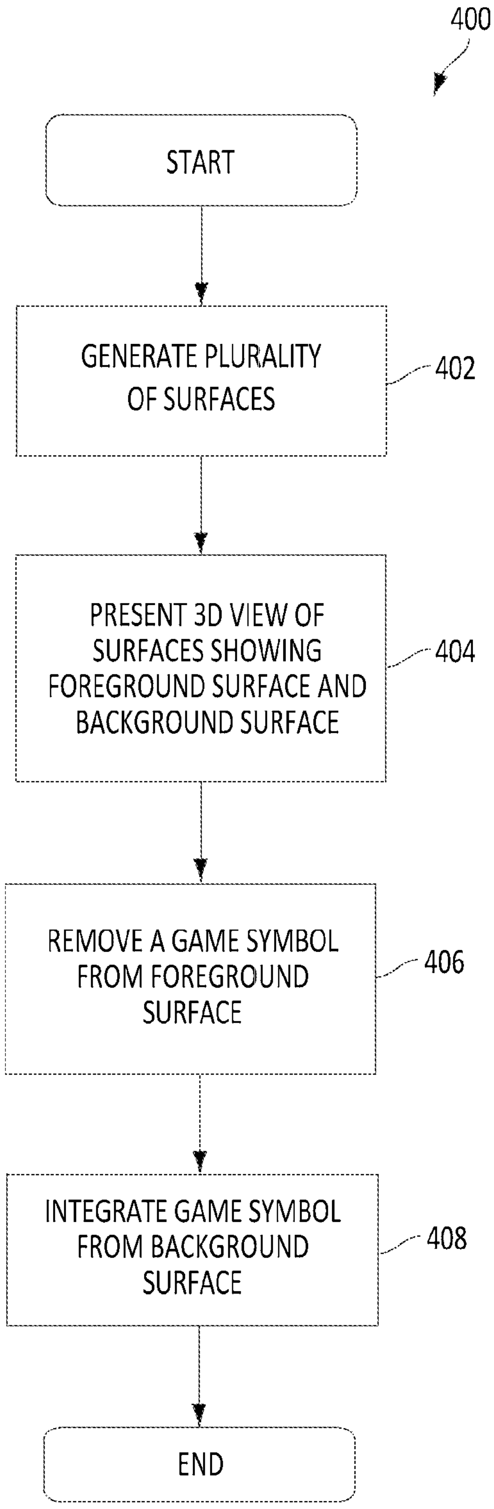
FIG. 4 is a flowchart diagram depicting exemplary bocks performed at an electronic gaming machine, in accordance with an embodiment.

FIG. 4 is a flowchart that depicts exemplary blocks 400 and onward performed at EGM 10 to provide 3D enhancements relating to the plurality of game surfaces. As will be appreciated, although exemplary operation is described with reference to EGM 10, substantially similar blocks may be performed in a distributed manner at gaming device 60 and gaming server 80.

Before blocks 400 and onward are performed at EGM 10, an electronic data store at EGM 10 is populated with game data for one or more games. The games may include any of the various game types noted above. The game data includes a set of game rules for each of the games.

A particular game is selected by the player for play at EGM 10. The particular game may also be selected by EGM 10 without user input. The game may be a primary game, a secondary game, or a bonus game.

EGM 10 performs blocks 400 and onward by executing instructions at one or more processors, e.g., at processor 56 in cooperation with 3D graphics processor 54. The instructions may be stored in memory 58.

When a game begins, at block 402, EGM 10 generates a plurality of game surfaces, each for displaying at least one game symbol thereon. The game surface may be generated using at least 3D graphics processor 54.

The game surfaces may be generated in accordance with the rules for the current game. For example, when the current game is a spinning reel game, one or more of the game surfaces may be generated to include a plurality of reels, each having one or more game symbols for the reel game. EGM 10 determines the rules for the current game using game data stored at its electronic data store.

At block 404, EGM 10 presents a 3D view of the game surfaces on an electronic display, e.g., display 12 or display 14. In this 3D view, the game surfaces are arranged in layers such that a foreground game surface appears to be closer to the user than a background game surface. The 3D view may, for example, be an isometric view, a perspective view, or the like. The 3D view may be rendered, for example, by 3D graphics processor 54.

Figure 5:
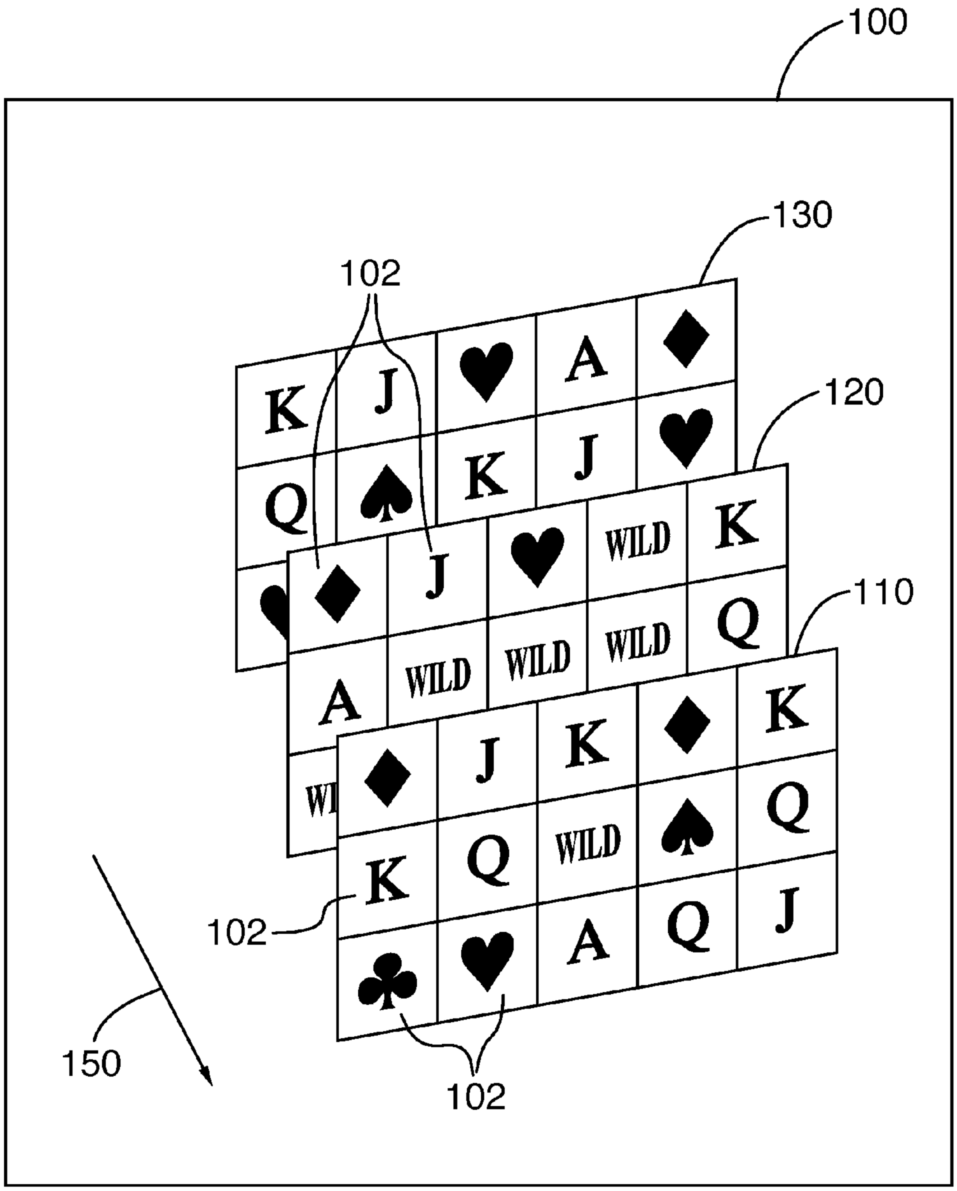
FIG. 5 is a view of an example screen with foreground and background game surfaces, in accordance with an embodiment.

FIG. 5 shows an exemplary 3D view 100 of a plurality of game surfaces arranged in layers, exemplary of an embodiment. In particular, the layered game surfaces include a foreground game surface 110 displaying a plurality of game symbols 102 thereon. The layered game surfaces also include a background game surface 120 positioned along an axis 150 behind foreground game surface 110. The layered game surfaces also include a further background game surface 130 along axis 150 behind background game surface 120.

So, in 3D view 100, foreground game surface 110 appears to be closer to the user than background game surface 120, and background game surface 120 appears to be closer to the user than background game surface 130.

As shown, 3D view 100 is presented to display the plurality of game surfaces at an angle such that a portion of background game surface 120 is viewable, while a portion of background game surface 120 is occluded from view by foreground game surface 110. Similarly, a portion of background game surface 130 is viewable, while a portion of background game surface 130 is occluded from view by the game surfaces in front of it (e.g., background game surface 120). Game symbols 102 in occluded portions of the game surfaces are not visible, or are only partially visible.

Symbols 102 on each of the game surfaces may be arranged in a grid. In some games, each column of the grid may correspond to a spinning reel. The game surfaces may share a common grid to form a 3D matrix of game symbols 102. Within this 3D matrix, the position of each game symbol 102 may be specified using X, Y, Z coordinates, where X and Y coordinates are specified along axes parallel to a game surface, and a Z coordinate is specified along axis 150.

Further, within this 3D matrix, each game symbol 102 on a particular game surface may be associated with a game symbol on a different game surface, e.g., having the same X, Y coordinates and a different Z coordinate. So, for example, a game symbol 102 on the foreground game surface 110 may be associated with a particular game symbol 102 having the same X, Y coordinates on background game surface 120. As detailed below, certain game trigger events may trigger game interactions involving associated game symbols 102.

Each game symbol 102 may have a particular image, number, shape, color, theme, etc. Game symbols 102 may be associated with different payouts, in accordance with game rules. Game symbols 102 may interact with like symbols, e.g., symbols having similar images, numbers shapes, colours, themes, etc., to form winning combinations in accordance with game rules. Game symbols 102 may include special symbols, e.g., wildcard symbols that interact with any other symbol and therefore provide a higher likelihood of forming winning combinations.

EGM 10 may populate game surfaces with game symbols 102 selected according to the rules of the current game. EGM 10 may populate game surfaces with game symbols 102 that are selected randomly.

In the depicted embodiment, when a game begins, only game symbols 102 displayed on foreground game surface 102 are activatable. For example, activatable game symbols 102 may include symbols that are capable of interacting with each other during the current game, e.g., to form winning combinations. Activatable game symbols 102 may include symbols that are capable of user selection during the game. So, game symbols 102 on background game surfaces are initially excluded from game play in the current game, but may become integrated into the current game to become activatable. Such game symbols 102 may become integrated into the current game as the game is played, e.g., in response to pre-defined game trigger events, as further described below.

Game symbols 102 displayed on a game surface may change as the game is played. For example, one or more reels displayed on a game surface may be spun to change the displayed game symbols 102. Game symbols 102 may also change in response to user input.

Referring once again to FIG. 4, at block 406, EGM 10 removes at least one game symbol displayed on foreground game surface 110 from the current game. The at least one game symbol may be removed from the current game in response to a game trigger event defined by the game rules. A game symbol to be removed may be randomly selected, may be selected according to the game rules, or may be selected by the player. A game symbol to be removed may be selected based on the particular game trigger event triggering removal.

EGM 10 may remove a game symbol in association with a graphical animation effect representative of the removing, which may be displayed on one or more displays of EGM 10 (e.g., display 12 and/or 14). The graphical animation effect may, for example, depict the game symbol falling away from the game surface, and may include the game symbol interacting (e.g. bouncing, colliding, etc.) with the game surface and/or other game symbols as it falls. The graphical animation effect may, for example, depict the game symbol floating upwards out of view. The graphical animation effect may, for example, depict the game symbol fading away. Other graphical animation effects may also be used.

The graphical animation effect representative of the removing may include a visual designation of the game symbol to be removed. For example, the particular game symbol may glow, shake, crack, etc., or otherwise be visually distinguished from other game symbols.

Such game trigger events may include, for example, the beginning or ending of a round of the current game. In such case, removal of a game symbol may represent a reward for a player's progress through the current game.

Such game trigger events may include, for example, the beginning or ending of a bonus game or a secondary game associated with the current game. In such case, removal of a game symbol may represent a reward for triggering or completing the bonus game or the secondary game.

Such game trigger events may include, for example, activation of a particular game symbol. For example, one or more game symbols may be defined as being a "removal" symbol. So, one or more game symbols may be removed when the "removal" symbol becomes activated, e.g., when it becomes selected by the player or when it forms part of a winning combination. A game symbol removed in this manner may be the removal symbol itself, or another game symbol, e.g., a game symbol adjacent to, proximate to, or otherwise associated with the removal symbol. For example, removed game symbols may be game symbols that formed a winning combination with the removal symbol. Removal symbols may be visually distinguished from other game symbols.

Such game trigger events may also include, for example, expiry of a pre-defined time period. In such case, game symbols may be scheduled for removal at particular time intervals, e.g., every few seconds, every minute, or every few minutes, etc.

Such game trigger events may also include, for example, receipt of a player interaction input reflective of a user request to remove a game symbol. The user request may be issued, for example, through an input 50 (FIG. 2A). In an embodiment, EGM 10 may include a button indicated to be a "removal" button, and the user request may be issued by pressing or otherwise activating that button. In an embodiment, one or more of the displays (e.g., displays 12 and/or 14) of EGM 10 may be a touch-sensitive display, and the user request may be issued by one or more touch inputs to the touch-sensitive display. In an embodiment, EGM 10 may be configured to allow the user to request removal of a particular game symbol or particular game symbols. In an embodiment, EGM 10 may be configured to allow the user to request removal of a random symbol, and EGM 10 may randomly select a game symbol to be removed.

Figure 6:
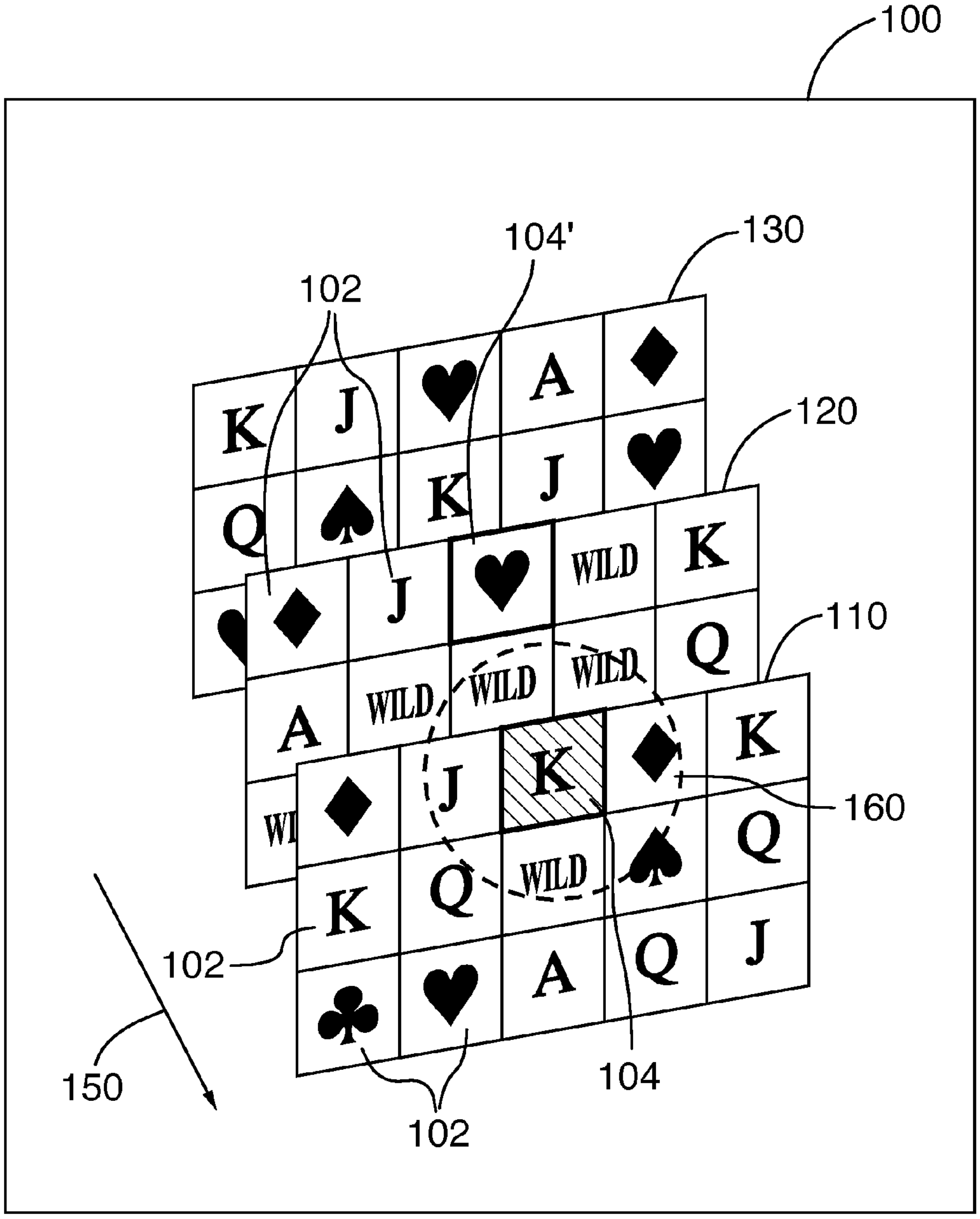
FIG. 6 is a view of an example screen showing a game symbol on a foreground game surface selected for removal, in accordance with an embodiment.

FIG. 6 shows an exemplary 3D view 100 showing a particular game symbol displayed on foreground game surface 110, namely game symbol 104, selected to be removed in response to one of the above-noted game trigger events.

Figure 7:
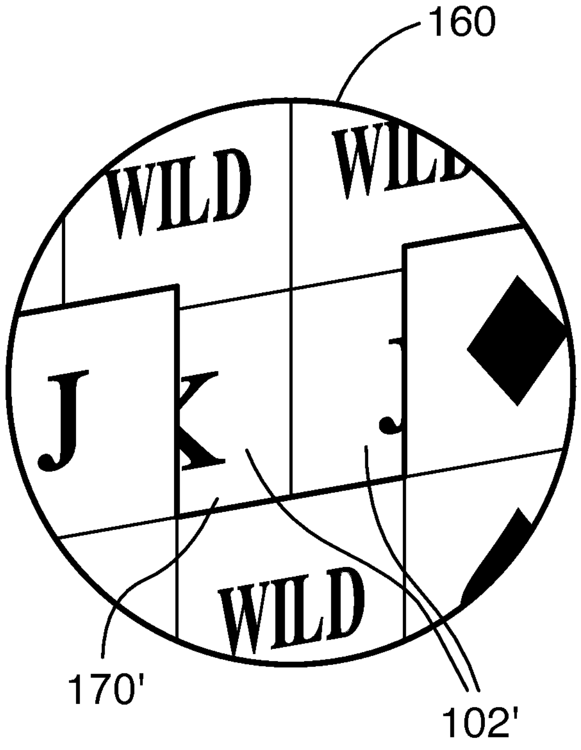
FIG. 7 is an enlarged partial view of a portion of the screen of FIG. 6 showing a game symbol removed from a foreground game surface, in accordance with an embodiment.

FIG. 7 is an enlarged view of region 160 of FIG. 7 after game symbol 104 has been removed from the current game. As shown, removal of game symbol 104 creates an opening 170. Opening 170 serves as a window or portal through which at least one game symbol 102' displayed on background game surface 120 is viewable. Such game symbols 102' displayed on background game surface 120 may be wholly viewable or partially viewable through opening 170. In this way, the player may be provided with a preview of game symbols 102' on background game surface 120 that may become integrated into the current game as the game is played. This preview may provide the player with an incentive to continuing playing (e.g., if the previewed game symbols 120' are high payout symbols). This preview may also provide the player with an opportunity to plan game play according to the previewed game symbols 102', in anticipation of integration of those game symbols into the current game.

Referring once again to FIG. 4, at block 408, after a game symbol has been removed from foreground game surface 102, EGM 10 integrates at least one game symbol displayed on background game surface 120 into the current game in accordance with the game rules. The game symbol is integrated into the current game such that it becomes activatable, and is able to interact with remaining game symbols 102 displayed on foreground game surface 110, i.e., game symbols 102 displayed on foreground game surface 110 that were not removed at block 406. In this way, the game symbol integrated from background game surface 120 replaces the game symbol removed from foreground game surface 110.

EGM 10 may integrate game symbol in association with a graphical animation effect representative of the integrating, which may be displayed on one or more displays of EGM 10 (e.g., display 12 and/or 14). The graphical animation effect may, for example, depict the game symbol moving from background game surface 120 to foreground game surface 110. The graphical animation effect may, for example, depict the game symbol falling into place. Other graphical animation effects may also be used.

A game symbol to be integrated into the current game may be randomly selected, or may be selected according to the game rules. A game symbol to be integrated into the current game may be selected based on the particular game trigger event triggering removal. A game symbol to be integrated may be selected as the game symbol on background game surface 120 that is associated with a game symbol removed from foreground game surface 110.

The particular game symbol on background game surface 120 to be integrated into the current game, and the game symbol on foreground game surface 110 removed from the current game may have corresponding grid positions on those surfaces. For example, a particular game symbol to be integrated may have the same X, Y coordinates as a game symbol removed from foreground game surface 110. For example, the game symbol to be integrated into the current game may be game symbol 104' (FIG. 6), which has the same X, Y coordinates as game symbol 104 removed from foreground game surface 110.

A game symbol integrated from background game surface 120 may form winning combinations with remaining game symbols on foreground game surface 110, in place of the removed game symbol. For example, the integrated game symbol may form line wins with remaining game symbols on foreground game surface 110, in place of the removed game symbol.

In an embodiment, an integrated game symbol may maintain its position on background game surface 120. In an embodiment, an integrated game symbol may move to a position on foreground game surface 110, e.g., the position vacated by a removed game symbol.

Figure 8:
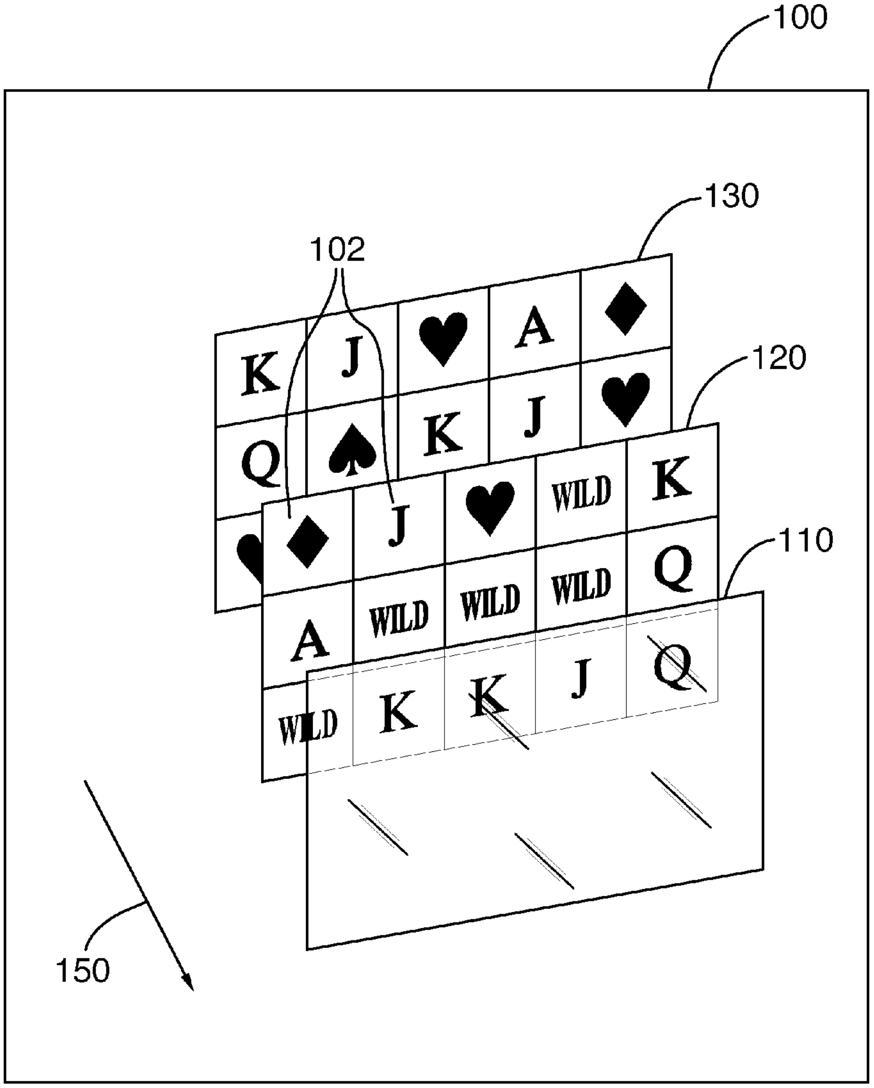
FIG. 8 is a view of an example screen showing a transparent foreground game surface, in accordance with an embodiment.

In the depicted embodiment, foreground game surface 110 is opaque such that it occludes a portion of background game surface 120 from view. Similarly, background game surface 120 is opaque such that it occludes a portion of further background game surface 130 from view. However, as depicted in FIG. 8, foreground game surface 110 may be at least semi-transparent or semi-translucent such that the occluded portion of background game surface 120 is viewable, including any game symbols in the occluded portion. Similarly, any of the background surfaces may also be at least semi-transparent or semi-translucent.

In this way, the player may be provided with a preview of game symbols on a background game surface that may become integrated into the current game as the game is played.

In an embodiment, EGM 10 may remove foreground game surface 110 from the current game in response to a game trigger event. For example, EGM 10 may remove foreground game surface 110 from the current game when all the game symbols formerly displayed on the foreground game surface 110 have been removed from the current game. In such situation, EGM 10 may promote background surface 120 to become the new foreground surface. AI game symbols on background surface 120 may become integrated into the current game, and thereby become activatable game symbols.

Figure 9:
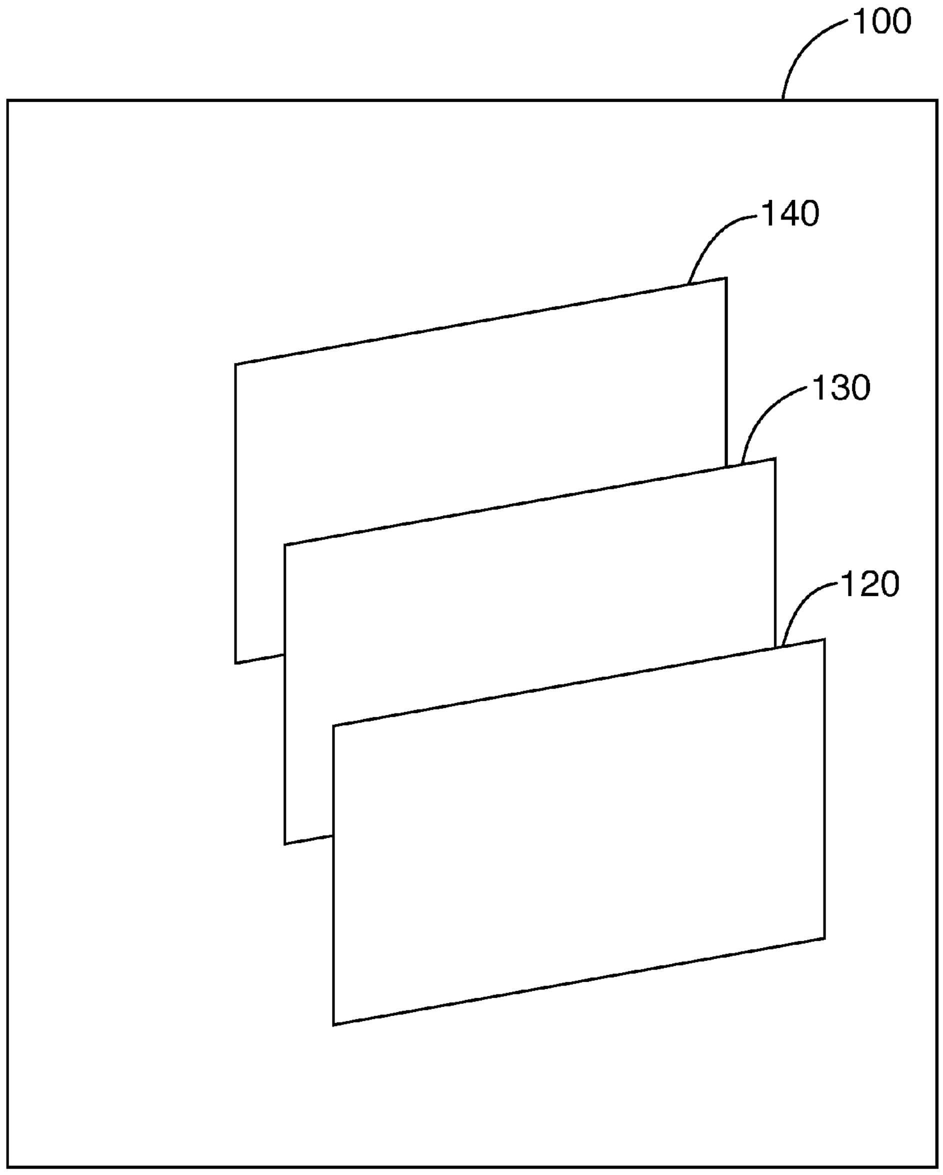
FIG. 9 is a view of an example screen showing removal of a foreground game surface, in accordance with an embodiment.

FIG. 9 shows an exemplary 3D view 100 of a plurality of game surfaces in which foreground game surface 110 has been removed from the current game. As shown, background game surface 120 has been promoted to become the foreground game surface. In an embodiment, the 3D view 100 may be updated such that the game surfaces move along axis 150, with background game surface 120 assuming the position formerly occupied by foreground game surface 110. Similarly, background game surface 130 may assume the position formerly occupied by background game surface 120. In an embodiment, the 3D view 100 may be updated such that the game surfaces remain in position, but the view moves towards the game surfaces or zooms in towards the game surfaces.

As shown in FIG. 9, a new background game surface 140 may be generated to take the position formerly occupied by background game surface 130. Although, game symbols have been omitted from FIG. 9 for clarity of illustration, each of game surfaces 120, 130, and 140 may have one or more game symbols displayed thereon.

In an embodiment, EGM 10 may generate the plurality of game surfaces and order the game surfaces into layers such that expected winnings of the current game increases as the game is played, i.e., as game symbols displayed on the foreground game surface are removed from the current game and game symbols displayed on background game surfaces are integrated into the game. In this way, EGM 10 may reward a player for game progression, e.g., successful play or long play, thereby creating an incentive for game progression.

In an embodiment, the plurality of game surfaces are generated and ordered such that wildcard game symbols are displayed with increasing frequency on the game surfaces that appear progressively farther from the user. For example, as depicted in FIG. 5, background game surface 120 may include more wildcard game symbols than foreground game surface 110.

In an embodiment, the plurality of game surfaces are generated and ordered such that game symbols associated with progressively higher payouts are displayed on the game surfaces that appear progressively farther from the user.

In an embodiment, EGM 10 may be configured to provide a preview of one or more game symbols displayed on background game surfaces (e.g., surface 120 or 130). EGM 10 may be configured to provide such a preview by temporarily displaying foreground game surface 110 to be at least semi-transparent or semi-translucent.

In the depicted embodiment, each of the game surfaces is positioned along axis 150 at a pre-defined distance away from adjacent game surfaces. In other embodiments, the distance between game surfaces may be smaller or larger. Further, in the depicted embodiment, each of the game surfaces is positioned along axis 150 to be equidistant from adjacent game surfaces. However, in another embodiment, distances between game surfaces may vary. Further, in an embodiment, distances between game surfaces may change during gameplay, e.g., to become closer together or become farther apart in response to game trigger events, or as time progresses.

Figure 10:
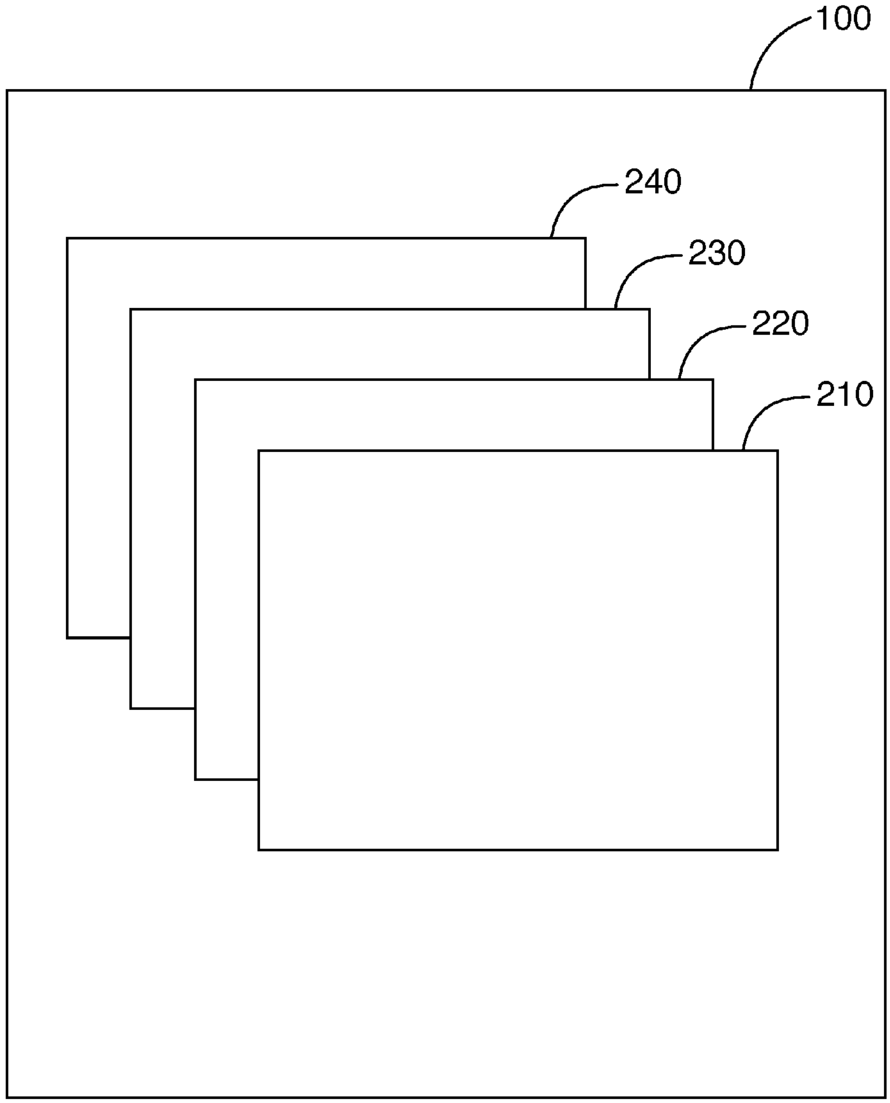
FIG. 10 is a view of an example screen with foreground and background game surfaces, in accordance with an embodiment.

In the depicted embodiment, three game surfaces are presented. However, in another embodiment, a 3D view 100 may present a fewer number or a greater number of game surfaces. For example, FIG. 10 shows an exemplary 3D view 100 with four game surfaces, i.e., foreground game surface 210 and background game surfaces 220, 230, and 240. As shown, in an embodiment, the angle at which the plurality of game surfaces are presented in 3D view 100 may vary. In an embodiment, this angle may be user adjustable. In an embodiment, this angle may change as the game is played, e.g., over time or in response to certain game trigger events.

In an embodiment, EGM 10 presents the game surfaces in 3D view 100 such that each successive game surface behind the foreground game surface appears to be progressively farther from the user. In another embodiment, EGM 10 presents the game surfaces in 3D view 100 such that two or more of the game surfaces appear to be the same distance from the user (e.g., having the same Z position along axis 150).

In the depicted embodiment, each of the game surfaces has a rectangular shape. However, in another embodiment, one or more of the game surfaces may have a different shape. For example, the game surfaces may have a square shape, a trianglular shape, a circular shape, a trapezoidal shape, or the like.

In the depicted embodiment, each of the game surfaces has a uniform size and shape. However, in another embodiment, the game surfaces may have non-uniform sizes and shapes. Further, the game surfaces may have non-uniform numbers of game symbols displayed thereon.

In an embodiment, certain game trigger events may cause game symbols to be added to a game surface (e.g., foreground game surface 110). Such added game symbols may be previously removed game symbols, or may be new game symbols. Game symbols may be added at openings created by removal of game symbols, to fill such openings.

In an embodiment, the game provided at EGM 10 may be a wagering game. In this embodiment, EGM 10 may be configured to receive wagers from the user.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the following discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

One should appreciate that the systems and methods described herein may [note to draftsperson: consider describing example technical effects and solutions e.g. better memory usage, improved processing, improved bandwidth usage]

The following discussion provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

Embodiments described herein may be implemented by using hardware only or by using software and a necessary universal hardware platform. Based on such understandings, the technical solution of embodiments may be in the form of a software product. The software product may be stored in a nonvolatile or non-transitory storage medium, which can be a compact disk read-only memory (CD-ROM), USB flash disk, or a removable hard disk. The software product includes a number of instructions that enable a computer device (personal computer, server, or network device) to execute the methods provided by the embodiments.

The embodiments described herein are implemented by physical computer hardware. The embodiments described herein provide useful physical machines and particularly configured computer hardware arrangements. The embodiments described herein are directed to electronic machines methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, a various hardware components. Substituting the computing devices, servers, receivers, transmitters, processors, memory, display, networks particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to the embodiments described herein and is not merely used to perform steps expeditiously and in an efficient manner.

The embodiments described herein may be implemented by physical computer hardware embodiments. The embodiments described herein provide useful physical machines and particularly configured computer hardware arrangements of computing devices, servers, electronic gaming terminals, processors, memory, networks, for example. The embodiments described herein, for example, is directed to computer apparatuses, and methods implemented by computers through the processing of electronic data signals.

The embodiments described herein involve computing devices, servers, electronic gaming terminals, receivers, transmitters, processors, memory, display, networks particularly configured to implement various acts. The embodiments described herein are directed to electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, a various hardware components.

Substituting the computing devices, servers, electronic gaming terminals, receivers, transmitters, processors, memory, display, networks particularly configured to implement various acts for non-physical hardware, using mental steps for example, may substantially affect the way the embodiments work.

Such computer hardware limitations are clearly essential elements of the embodiments described herein, and they cannot be omitted or substituted for mental means without having a material effect on the operation and structure of the embodiments described herein. The computer hardware is essential to the embodiments described herein and is not merely used to perform steps expeditiously and in an efficient manner.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps As can be understood, the examples described above and illustrated are intended to be exemplary only. The scope is indicated by the appended claims.

What is claimed is:

1. An electronic gaming machine comprising:

an electronic data store storing game data for a given game;

an electronic 3D-enabled gaming display; and one or more processors in communication with the electronic data store and the electronic 3D-enabled gaming display, the one or more processors comprising a three-dimensional graphics processor;

an acceptor of a physical item associated with a monetary value;

a cashout button actuatable to cause an initiation of a payout associated with a credit balance;

the one or more processors configured to:

generate, with at least the three-dimensional graphics processor, a plurality of game surfaces using the game data, each of the game surfaces for displaying at least one game symbol thereon;

present, using a display controller connected to the three-dimensional graphics processor, a three-dimensional view of the game surfaces on the electronic 3D-enabled gaming display, the game surfaces arranged in layers such that a foreground game surface of the plurality of game surfaces appears to be closer to a user than a background game surface of the plurality of game surfaces that is displayed behind the foreground game surface, the foreground game surface having a plurality of game symbols displayed thereon; and in response to a game trigger event:

remove at least one game symbol displayed on the foreground game surface from the given game in association with a graphical animation effect displayed on the electronic 3D-enabled gaming display representative of the removing, the graphical animation effect comprising a visual designation of the at least one game symbol; and integrate at least one game symbol displayed on the background game surface into the given game in association with a graphical animation effect displayed on the electronic 3-D gaming display representative of the integrating, such that the integrated at least one game symbol interacts with remaining game symbols displayed on the foreground game surface, wherein the plurality of game surfaces are generated such that game symbols associated with progressively higher payouts are displayed on the game surfaces that appear in the layers that are progressively further behind the foreground game surface.

2. The electronic gaming machine of claim 1, wherein the three-dimensional view is presented at an angle such that a portion of the background game surface is viewable and a portion of the background game surface is occluded from view by the foreground game surface.

3. The electronic gaming machine of claim 2, wherein the three-dimensional view is presented such that removal of a game symbol displayed on the foreground game surface creates an opening through which at least one game symbol displayed on the background game surface is viewable.

4. The electronic gaming machine of claim 1, wherein the foreground game surface is opaque.

5. The electronic gaming machine of claim 1, wherein the foreground game surface is at least semi-transparent such that at least one game symbol displayed on the background game surface is viewable through the foreground game surface.

6. The electronic gaming machine of claim 1, wherein the one or more processors are configured to increase expected winnings of the given game as game symbols are removed from the given game.

7. The electronic gaming machine of claim 1, wherein the plurality of game surfaces are generated such that wildcard game symbols are displayed with increasing frequency on the game surfaces that appear in the layers that are progressively further behind the foreground game surface.

8. The electronic gaming machine of claim 1, wherein the plurality of game surfaces comprises at least three game surfaces, and wherein the game surfaces are presented in the three-dimensional view such that each successive game surface behind the foreground game surface appears to be progressively further behind the foreground game surface on the 3D gaming display.

9. The electronic gaming machine of claim 1, wherein the game trigger event comprises an activation of a symbol associated with removal of a game symbol.

10. The electronic gaming machine of claim 1, wherein the game trigger event comprises receiving a player interaction input.

11. The electronic gaming machine of claim 10, wherein the electronic 3D-enabled gaming display is touch-sensitive, and the player interaction input is received as touch input by way of the electronic 3D-enabled gaming display.

12. The electronic gaming machine of claim 1, wherein the game trigger event comprises an end or start of a round of the given game.

13. The electronic gaming machine of claim 1, wherein the game trigger event comprises a formation of a winning combination including the at least one game symbol to be removed.

14. The electronic gaming machine of claim 1, wherein the one or more processors are configured to remove the foreground game surface from the given game, and promote the background game surface to become the foreground game surface.

15. The electronic gaming machine of claim 14, wherein the foreground game surface is removed from the given game when all game symbols displayed on the foreground game surface have been removed from the given game.

16. The electronic gaming machine of claim 1, wherein the game symbols displayed on at least one of the game surfaces are arranged in a grid.

17. The electronic gaming machine of claim 16, wherein the game symbol removed from the foreground game surface and the game symbol integrated from the background game surface have corresponding positions in the grid.

18. The electronic gaming machine of claim 1, wherein the given game is a wagering game, and wherein the one or more processors are configured to receive wagers from a user.

19. The electronic gaming machine of claim 1, wherein the game data comprises a set of game rules for the given game.

20. The electronic gaming machine of claim 19, wherein the plurality of game surfaces are generated in accordance with the set of games rules, the game trigger event is defined by the set of game rules, and the integrating is in accordance with the set of game rules.

21. A method for providing an electronic game, the method comprising:

generating, using at least one processor, a plurality of game surfaces using game data, each of the game surfaces for displaying at least one game symbol thereon;

receiving, via an acceptor, a physical item associated with a monetary value;

initiating, responsive to actuation of a cashout button, a payout associated with a credit balance;

presenting a three-dimensional view of the game surfaces on an electronic 3D-enabled gaming display, the game surfaces arranged in layers such that a foreground game surface of the plurality of game surfaces appears to be closer to a user than a background game surface of the plurality of game surfaces that is displayed behind the foreground game surface, the foreground game surface having a plurality of game symbols displayed thereon; and in response to a game trigger event:

removing, using the at least one processor, at least one game symbol displayed on the foreground game surface from the given game in association with a graphical animation effect displayed on the electronic 3D-enabled gaming display representative of the removing, the graphical animation effect comprising a visual designation of the at least one game symbol; and integrating, using the at least one processor, at least one game symbol displayed on the background game surface into the given game in association with a graphical animation effect displayed on the electronic 3-D gaming display representative of the integrating, such that the integrated at least one game symbol interacts with remaining game symbols displayed on the foreground game surface, wherein the plurality of game surfaces are generated such that game symbols associated with progressively higher payouts are displayed on the game surfaces that appear in the layers that are progressively further behind the foreground game surface.

22. The method of claim 21, further comprising: removing the foreground game surface from the given game, and promoting the background game surface to become the foreground game surface.

23. A computer system for providing an electronic game, the computer system comprising:

a gaming device having an electronic 3D-enabled gaming display, the gaming device being communicatively coupled, via a communication network, to a gaming server that includes an electronic data store that stores game data for a given game;

the gaming device further comprising:

one or more gaming device processors, wherein the one or more gaming device processors comprise a three-dimensional graphics processor;

an acceptor of a first physical item associated with a monetary value; and a cashout button actuatable to cause an initiation of a payout associated with a credit balance;

the gaming device configured to:

generate a plurality of game surfaces using the game data stored at the gaming server, each of the game surfaces for displaying at least one game symbol thereon;

present, using a display controller connected to the three-dimensional graphics processor, a three-dimensional view of the game surfaces on the electronic 3D-enabled gaming display of the gaming device, the game surfaces arranged in layers such that a foreground game surface of the plurality of game surfaces appears to be closer to a user than a background game surface of the plurality of game surfaces, the foreground game surface having a plurality of game symbols displayed thereon; and in response to a game trigger event:

remove at least one game symbol displayed on the foreground game surface from the given game in association with a graphical animation effect displayed on the electronic 3D-enabled gaming display representative of the removing, the graphical animation effect comprising a visual designation of the at least one game symbol; and integrate at least one game symbol displayed on the background game surface into the given game in association with a graphical animation effect displayed on the electronic 3-D gaming display representative of the integrating, the integrating such that the integrated at least one game symbol interacts with remaining game symbols displayed on the foreground game surface, wherein the plurality of game surfaces are generated such that wildcard game symbols are displayed with increasing frequency on the game surfaces that appear in the layers that are progressively further behind the foreground game surface.

24. An electronic gaming machine comprising:

an electronic data store storing game data for a given game;

an electronic 3D-enabled touch-sensitive gaming display;

an acceptor of a first physical item associated with a monetary value;

a cashout button actuatable to cause an initiation of a payout associated with a credit balance; and one or more processors in communication with the at least one electronic data store and the electronic 3D-enabled gaming display, the one or more processors comprising a three-dimensional graphics processor;

the one or more processors configured to:

generate, with at least the three-dimensional graphics processor, a plurality of game surfaces using the game data, each of the game surfaces for displaying at least one game symbol thereon;

present, using a display controller connected to the three-dimensional graphics processor, an interactive three-dimensional view of the game surfaces on the electronic 3D-enabled gaming display, the game surfaces arranged in layers such that a foreground game surface of the plurality of game surfaces appears to be closer to a user than a background game surface of the plurality of game surfaces, the foreground game surface having a plurality of game symbols displayed thereon; and in response to a touch input received by way of the touch-sensitive gaming display or a pre-defined game trigger event:

remove at least one game symbol displayed on the foreground game surface from the given game in association with a graphical animation effect displayed on the electronic 3D-enabled gaming display representative of the removing, the graphical animation effect comprising a visual designation of the at least one game symbol; and integrate at least one game symbol displayed on the background game surface into the given game in association with a graphical animation effect displayed on the electronic 3-D gaming display representative of the integrating, such that the integrated at least one game symbol interacts with remaining game symbols displayed on the foreground game surface, wherein the plurality of game surfaces are generated such that wildcard game symbols are displayed with increasing frequency on the game surfaces that appear in the layers that are progressively further behind the foreground game surface.

* * * * *